C. F. WARD.
SEED PLANTER.
APPLICATION FILED AUG. 2, 1909.
946,746.
Patented Jan. 18, 1910.
2 SHEETS—SHEET 1.
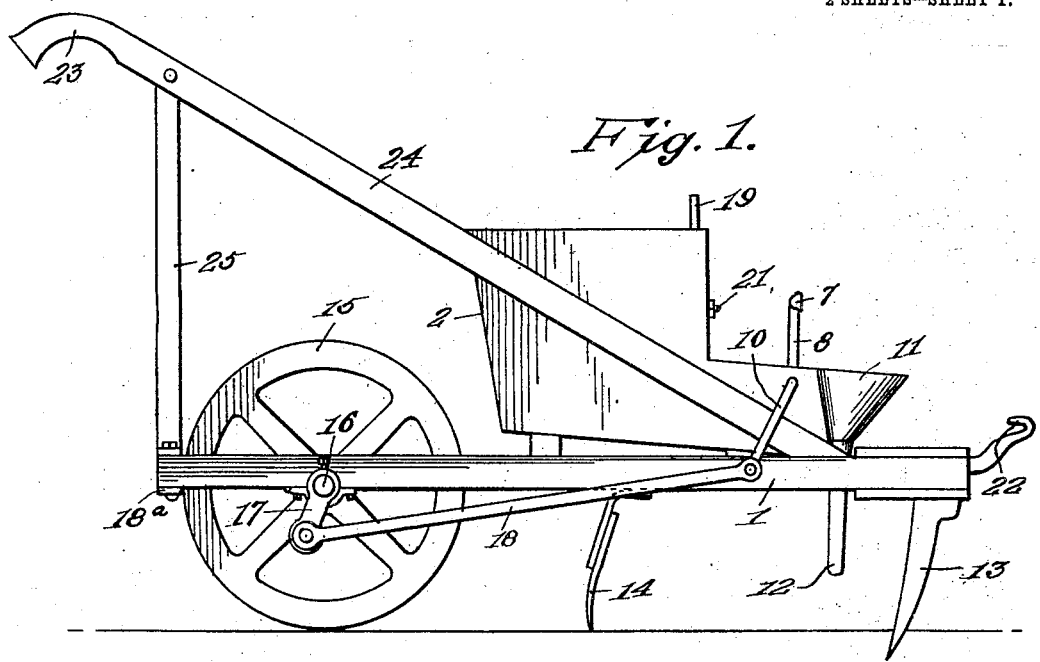
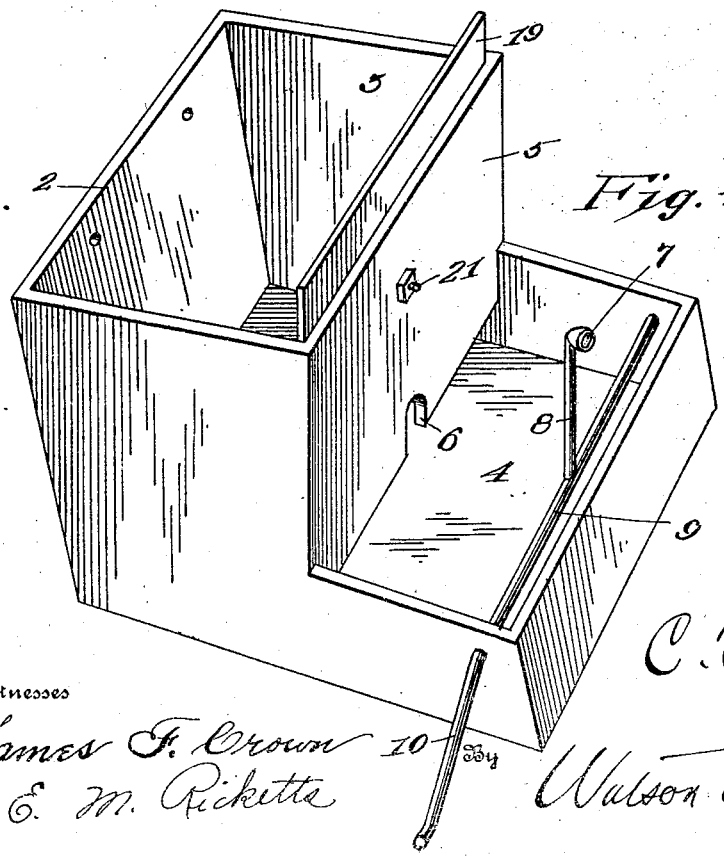

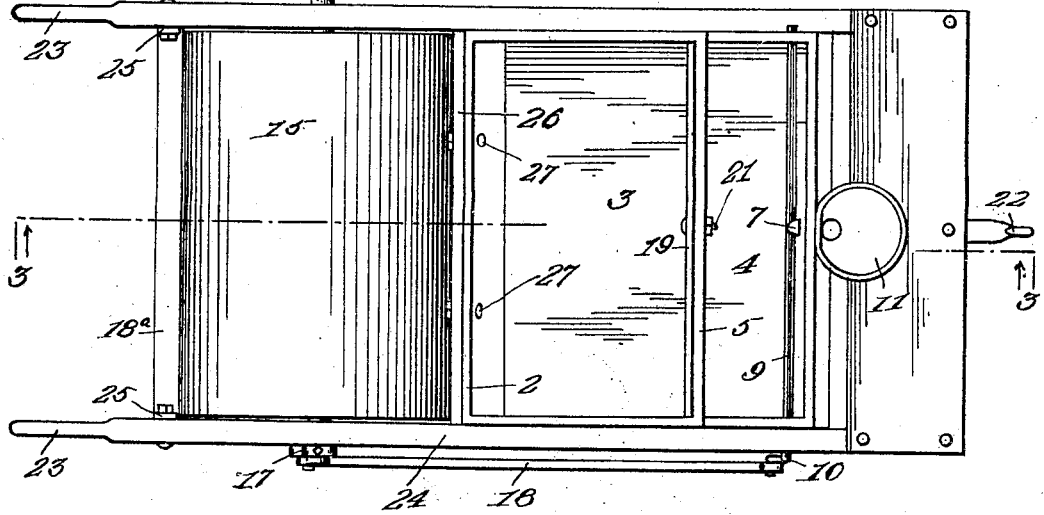
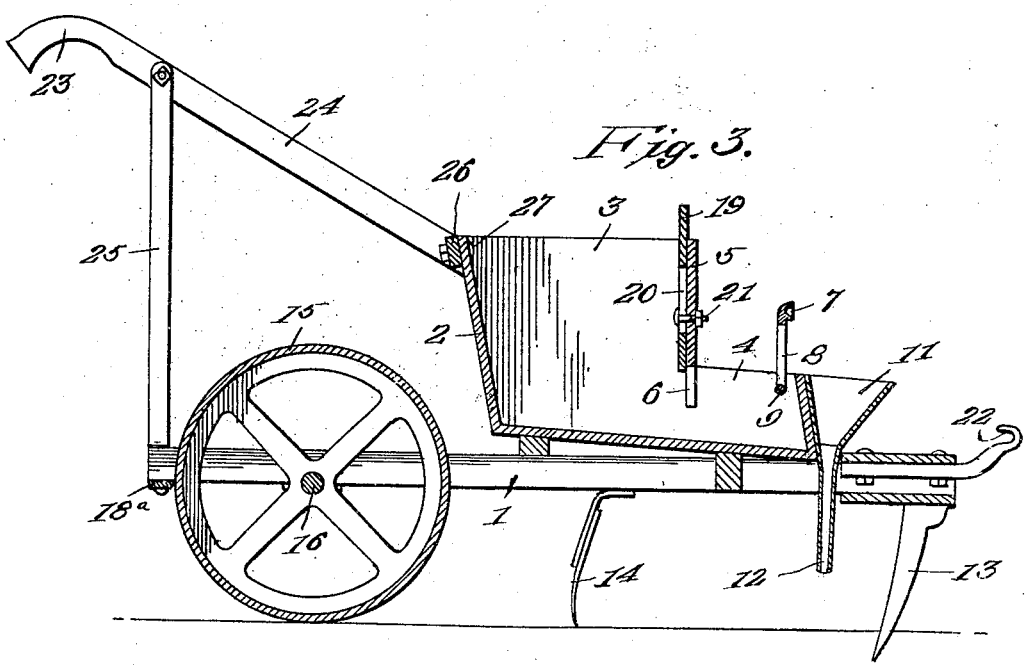

UNITED STATES PATENT OFFICE.

CHARLES F. WARD, OF WHITEVILLE, NORTH CAROLINA.

SEED-PLANTER.

946,746. Specification of Letters Patent. Patented Jan. 18, 1910.

Application filed August 2, 1909. Serial No. 510,815.

*To all whom it may concern:*

Be it known that I, CHARLES F. WARD, a citizen of the United States, residing at Whiteville, in the county of Columbus and State of North Carolina, have invented certain new and useful Improvements in Seed-Planters, of which the following is a specification, reference being had to the accompanying drawings.

This invention relates to improvements in seed planters for planting corn, beans, peas, and other grain or seed.

The object of the invention is to provide a simple and practical device of this character which may be produced at a small cost and which will be reliable and efficient in operation.

With the above and other objects in view, the invention consists of the novel features of construction and the combination and arrangement of parts hereinafter fully described and claimed, and illustrated in the accompanying drawings, in which—

Figure 1 is a side elevation of the improved grain or seed planter; Fig. 2 is a top plan view; Fig. 3 is a vertical section taken on the plane indicated by the line 3—3 in Fig. 2; and Fig. 4 is a perspective view of the seed hopper and feeding device.

The invention comprises a frame 1 preferably composed of side bars connected by cross bars and adapted to carry a seed hopper 2 of improved construction. This hopper has a deep rear portion 3 and a shallow front portion 4, the two portions being separated by an upright partition plate 5, the lower end of which is spaced from the bottom of the hopper. At the center of the bottom edge of the partition plate 5 is a feed notch or recess 6 through which corn or other grain or seed in the deep rear portion of the hopper is adapted to feed to the grain discharge cup or pocket 7 formed on the end of a forwardly and rearwardly oscillating arm 8 provided on a rock shaft 9. The latter is journaled in suitable bearings in the side walls of the shallow front portion 4 of the hopper and on one of its ends is a crank arm 10 by means of which it is rocked or oscillated.

The grain or seed cup 7 is lowered into the grain in the portion 4 of the hopper and immediately in front of the recess or notch 6 in the partition plate 5 picks up one or more kernels and throws them forwardly into a funnel-shaped receiving member 11 the reduced lower end of which forms a discharge tube 12. This tube is arranged in rear of a furrow opening standard 13 depending from the front portion of the frame, as shown in Fig. 3.

Arranged on the frame and depending therefrom on opposite sides and in rear of the furrow opening arm 13 are covering shovels 14, which latter are adapted to cover the grain or seed deposited in the earth by the tube 12.

15 denotes a roller fixed to a transverse shaft or axle 16 journaled in bearings on the side bars of the frame 1 in rear of the hopper and adapted to pack the earth over the deposited seed or grain. On one end of the shaft 16 is a crank arm 17 which is connected by a link or rod 18 to the crank arm 10 on the rock shaft 9. The length of the arms 17, and 10 are such that as the arm 17 rotates the arm 10 will oscillate, thereby causing the grain or seed cup 7 to be lowered into the grain in the hopper and then raised or swung forwardly to discharge the grain which it picks up, into the funnel-shaped receptacle 11. Any earth adhering to the roller 15 is removed from the same by a scraper blade 18ª arranged on the rear ends of the side bars of the frame 1, as shown.

If desired, the feed of the grain through the notch or recess 6 in the bottom of the plate 5 may be regulated by a gage plate or board 19 which is vertically adjustable on the inner face of the partition plate 5. Said gage plate 19 is formed with a vertical slot 20 to receive a bolt or other fastening 21, as more clearly shown in Fig. 3

22 denotes a hook arranged at the front end of the frame for the attachment of a draft tree and 23 denotes handles on the upper rear ends of upwardly and rearwardly inclined handle bars 24. The latter are supported by uprights 25 and are connected by a cross bar 26, to which latter the rear wall of the hopper 2 is secured by bolts or similar fastenings 27.

In operation, when the hopper 2 is filled with corn or other grain or seed and the machine is drawn forwardly by draft animals attached to the hook or clevis 22, the rotary movement of the roller 15 will be imparted to the rock shaft 9 and the arm 8 on the latter will lower the grain cup 7 into the contents of the hopper to pick up one or more seed according to the size of said cup and then elevate the same and discharge them into the funnel-shaped receptacle 11, which latter in turn discharges them into the dropping tube 12. The grain or seed will thus be dropped at intervals in the furrow made by the standard 13 and such grain will be covered by the shovels 14 and the ground will be packed by the roller 15 as the machine advances.

While I have shown and described in detail the preferred embodiment of my invention, I wish it understood that I do not limit myself to the precise construction set forth since various changes in the form, proportion and arrangements of parts and in the details of construction may be resorted to without departing from the spirit or scope of the invention.

Having thus described the invention what is claimed is:

The herein described seed planter comprising a frame, a seed hopper arranged on the frame in a downwardly and forwardly inclined position and having a deep rear portion and a shallow front portion, the latter having an open top and being separated from the deep rear portion by an upright transverse partition, the lower edge of said partition being spaced from the inclined bottom of the hopper and formed with a recess to provide a discharge opening, a vertically adjustable gage plate mounted on said partition and adapted to control the outlet of seed through said recess, a transverse rock shaft rotatably mounted in the side walls of the shallow front portion of the hopper, a centrally disposed radially projecting arm upon said rock shaft and formed with a seed-receiving cup adapted to swing downwardly into the shallow portion of the hopper adjacent the recess in said partition, furrow opening means upon the front portion of the frame, a funnel shaped seed-receiving receptacle arranged at the front of the hopper and adapted to receive seed from said grain cup and to discharge it in rear of said furrow opening means, furrow closing means upon the intermediate portion of the frame, a transverse shaft journaled upon the rear portion of the frame, a packing roller fixed to said transverse shaft, crank arms upon said transverse shaft and said rock shaft, and a pitman connecting said crank arms whereby said rock shaft will be actuated from the transverse shaft.

In testimony whereof I hereunto affix my signature in the presence of two witnesses.

CHARLIE F. WARD.

Witnesses:
J. R. WILLIAMSON,
W. ROSS DAVIS.